No. 667,465.  
C. H. SEEGER & N. DEDRICK.  
UNIVERSAL JOINT.  
(Application filed Apr. 23, 1900.)

Patented Feb. 5, 1901.

(No Model.)

Witnesses  
N. E. Oliphant  
B. C. Roloff

Inventors  
Carl H. Seeger  
Nicholas Dedrick  
By H. G. Underwood  
Attorney

THE NORRIS PETERS CO., PHOTO-LITHO., WASHINGTON, D. C.

UNITED STATES PATENT OFFICE.

CARL H. SEEGER AND NICHOLAS DEDRICK, OF MANITOWOC, WISCONSIN.

UNIVERSAL JOINT.

SPECIFICATION forming part of Letters Patent No. 667,465, dated February 5, 1901.

Application filed April 23, 1900. Serial No. 13,980. (No model.)

*To all whom it may concern:*

Be it known that we, CARL H. SEEGER and NICHOLAS DEDRICK, citizens of the United States, and residents of Manitowoc, in the county of Manitowoc and State of Wisconsin, have invented certain new and useful Improvements in Universal Joints; and we do hereby declare that the following is a full, clear, and exact description thereof.

Our invention relates to a universal joint especially designed for use in connection with tools driven by a flexible shaft—such, for example, as are used in the dental and surgical arts, as well as in engraving, although not limited thereto; and it consists in certain peculiarities of construction and combination of parts, as will be fully set forth hereinafter in connection with the accompanying drawings and subsequently claimed.

Figure 1:
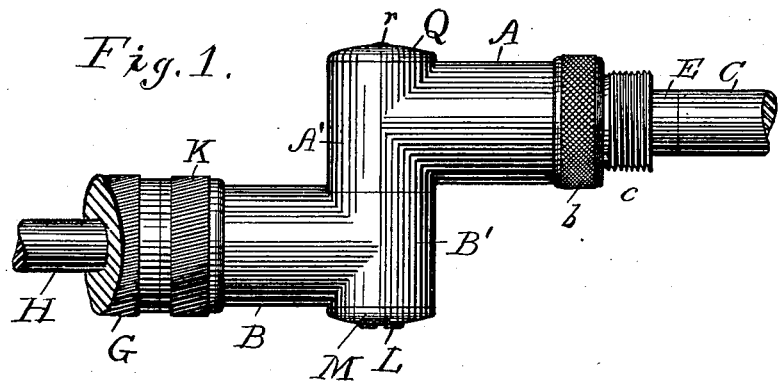
Figure 2:
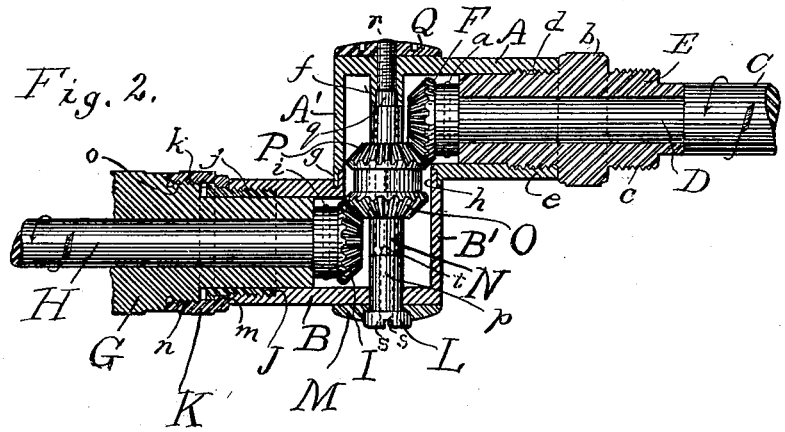

In the said drawings, Figure 1 is a representation in side elevation of a universal joint embodying our present invention, and Fig. 2 is a longitudinal sectional view thereof.

Referring to the drawings, A B represent the cylindrical bodies of the gear-casings of our devices, each having a transverse cylindrical head, (marked A' B', respectively,) which parts are made of ordinary steel, as indicated by the ordinary oblique section-lines in Fig. 2.

C represents the end piece, to which an ordinary flexible shaft (not shown) is attached.

D is a shaft rigid with the end piece C, said shaft being revoluble within the sleeve E, while beyond the inner end of said sleeve the hub of a miter gear-wheel F is secured to the adjacent end of said shaft, as by a pin $a$. The sleeve E is formed with a collar $b$, on each side of which the exterior surface of said sleeve is provided with screw-threads, as shown at $c$ $d$, the screw-threaded portion $c$ being to receive the casing (not shown) of the flexible shaft, while the screw-threaded portion $d$ is for engagement with the corresponding interiorly-screw-threaded end $e$ of the body A of the before-named casing A A'. The head A' of said casing has an inwardly-projecting nipple $f$, which extends at a right angle to the line of the shaft D, beyond the inner end of the latter, the said nipple having a smooth bore in its end, continued by an interiorly-screw-threaded bore which extends entirely through the said head A', which latter has an opening at the end opposite said nipple at a right angle to the opening at the outer end of the body A of the casing, and the wall of said head A', surrounding the said opening in the inner end thereof, is reduced in thickness or interiorly rabbeted, so as to form an annular shoulder $g$ to receive the corresponding annular shoulder $h$, formed by exteriorly rabbeting the wall surrounding the corresponding opening in the inner end of the head B' of the other gear-casing B B', whereby when the two casings are secured together, as hereinafter described, one head may turn upon the other.

G represents a sleeve, (which may form part of or be attached to a tool of any suitable nature to be operated by the hereinbefore-referred-to flexible shaft,) and this sleeve is of different external diameters at different points, but provided with a continuous smooth longitudinal bore, within which a shaft H is revoluble, the inner projecting end of said shaft having secured thereto, as by a pin $i$, the hub of another miter gear-wheel I. The outer end of the body B of the casing B B' is formed with interior screw-threads $j$, which engage with the exterior screw-threads on an annular bushing J, mounted loosely on the sleeve G, the said bushing having an annular flange $k$, and between said flange and the described screw-threads the said bushing has an exterior smooth annular band for engagement with an inward-extending annular flange $m$ on the adjacent end of an annular cap K, which is provided with inner screw-threads $n$ for engagement with exterior screw-threads $o$ on the adjacent part of the described sleeve G.

L represents a bolt or screw which serves to unite the hereinbefore-named heads A' B'. This bolt or screw is of greatest diameter at the part $p$ nearest its head, which part passes through a corresponding opening in the adjacent end of the head B' and through a like opening in the washer M, interposed between the casing-head B' and the head of the bolt or screw, after which the said bolt or screw (reduced in diameter, as indicated at $q$) receives a sleeve N, and brazed or otherwise rigidly secured to said sleeve or formed integrally therewith are a pair of miter gear-wheels O P, which engage, respectively, with the described miter gear-wheels I and F, fast on the ends of the said shafts H D, respectively. The reduced part $q$ of the bolt or screw L beyond the sleeve N fits within the smooth bore in the nipple $f$, and the threaded end $r$ of said bolt or screw engages with the screw-threaded part of the bore of said nipple and extends through the end of the casing-head A', where it is secured by a jam-nut Q. The revoluble sleeve N, which is loose on the described bolt or screw L, is held in place thereon and longitudinal movement of said sleeve prevented by the opposed end of the nipple $f$, forming a bearing for one end of the sleeve, and the annular end of the enlarged part $p$ of said bolt or screw constituting a bearing for the other end of the sleeve.

The described shafts D H, bolt or screw L, bushing J, cap K, washer M, nut Q, sleeves E N, and miter gear-wheels F I O P are made of what is called "tool-steel," which is made harder than the ordinary steel of which the gear-casings A A' B B' are formed, and this is indicated in the drawings by the peculiar double section-lines of such of these parts as are therein represented wholly or in part in section.

The portion of the bolt or screw L nearest the head thereof is provided with a longitudinal bore (indicated by the dotted lines marked $s\ s$) which communicates with a lateral opening, (indicated by a dotted circle $t$,) whereby the described sleeve N may be lubricated when necessary.

Our device will not only be found a perfectly-working universal joint, and hence of great convenience in the manipulation of tools employed in the various arts, which tools are driven by flexible shafts, but by reason of the hereinbefore-described gear-casings the described miter gear-wheels are protected from injury consequent upon exposure to dust and other foreign bodies, besides which the operator or person operated upon (in the example of its use in dental tools, for instance) is protected from injury resulting sometimes from the hair or beard being caught in or by the said gear-wheels, and thus a tool supplied with our invention may be handled with much greater ease and freedom than one not thus protected, which is a matter of great advantage and convenience.

By reason of the two casing-heads A' B' being revoluble freely one on the other on the annular shoulders $g\ h$, as already stated, the rotary movement of the two casings in one plane is secured to any point or degree desired, and for the further reason that the casing-body B and its bushing J are freely revoluble on the sleeve G the two movements thus described enable the tool to be instantly turned to any possible angle or inclination required without interrupting the continuous operation of said tool from the flexible shaft, thereby, as stated, constituting a perfect universal joint.

Having thus described our invention, what we claim as new, and desire to secure by Letters Patent, is—

1. A universal joint, comprising a pair of tubular casings, each having a cylindrical body and a transverse cylindrical head, said heads being held in contact at their open ends and having free rotary movement, one upon the other; a bolt or screw uniting said heads; a sleeve revoluble on said bolt or screw; a pair of miter gear-wheels fast on said sleeve; a sleeve in each casing-body, one body being fast, and the other body being loose and revoluble, on its respective sleeve; a pair of shafts, each revoluble in, and projecting through, one of the said casing-body sleeves; and another pair of miter gear-wheels, each secured to the inner projecting end of one of said shafts, and in engagement with one of the first-named pair of miter gear-wheels.

2. A universal joint, comprising a pair of tubular casings, each having a cylindrical body and a transverse cylindrical head, said heads being shouldered together at their opposed open ends, and having free rotary movement, one upon the other, and one of said heads having a nipple projecting inwardly therefrom; a bolt or screw uniting said heads, and passing through said nipple; a sleeve revoluble on said bolt or screw, and held in place by said nipple; a pair of miter gear-wheels fast on said sleeve; a smooth-bored bushing secured to the interior of one of the casing-bodies; a sleeve within said casing-body, secured to said bushing to prevent independent longitudinal movement of said sleeve, but permit free rotary movement of the casing-body and its bushing around said sleeve; a sleeve within, and held fast to, the other casing-body; a pair of shafts, each revoluble in, and projecting through, one of the said casing-body sleeves; and another pair of miter gear-wheels, each secured to the inner projecting end of one of said shafts, and in engagement with one of the first-named pair of miter gear-wheels.

In testimony that we claim the foregoing we have hereunto set our hands, at Manitowoc, in the county of Manitowoc and State of Wisconsin, in the presence of two witnesses.

CARL H. SEEGER.
NICHOLAS DEDRICK.

Witnesses:
 JAS. F. MORRIS,
 CHARLES SOBEL.